United States Patent
Wiegner et al.

(10) Patent No.: US 9,264,359 B2
(45) Date of Patent: Feb. 16, 2016

(54) METHOD FOR DATA TRANSMISSION USING A LINC AMPLIFIER, A LINC AMPLIFIER, A TRANSMITTING DEVICE, A RECEIVING DEVICE, AND A COMMUNICATION NETWORK THEREFOR

(75) Inventors: Dirk Wiegner, Schwaikheim (DE); Wolfgang Templ, Sersheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 827 days.

(21) Appl. No.: 13/266,162

(22) PCT Filed: Apr. 15, 2010

(86) PCT No.: PCT/EP2010/054958
§ 371 (c)(1), (2), (4) Date: Oct. 25, 2011

(87) PCT Pub. No.: WO2010/124940
PCT Pub. Date: Nov. 4, 2010

(65) Prior Publication Data
US 2012/0039603 A1 Feb. 16, 2012

(30) Foreign Application Priority Data
Apr. 28, 2009 (EP) ..................................... 09305363

(51) Int. Cl.
*H04B 10/2575* (2013.01)
*H04B 10/00* (2013.01)
(Continued)

(52) U.S. Cl.
CPC ............ *H04L 47/10* (2013.01); *H04L 43/0829* (2013.01); *H04L 43/12* (2013.01);
(Continued)

(58) Field of Classification Search
CPC ..................... H04B 10/2575; H04B 10/25752; H04B 10/25753; H04B 10/25756; H04B 10/25758; H04B 10/25759; H04B 2001/0425; H04B 2001/0433
See application file for complete search history.

(56) References Cited

U.S. PATENT DOCUMENTS 5,777,771 A   7/1998   Smith
5,990,734 A   11/1999  Wright et al.
(Continued)

FOREIGN PATENT DOCUMENTS

EP   1 343 335       9/2003
EP   1 553 791 A1   7/2005
(Continued)

OTHER PUBLICATIONS

Frohberg, Moglichkeiten and Grenzen eins halbleiterbasierten 35 GHz Verstarkers, Leipzig, Germany, date unknown (English translation of Abstract by Applicant).*
(Continued)

*Primary Examiner* — Darren E Wolf
(74) *Attorney, Agent, or Firm* — Fay Sharpe LLP

(57) ABSTRACT

The invention concerns a method for transmission of a data signal from a transmitting device (BS) to a receiving device (RAH1) using a LINC amplifier (LINC1, LINC2) for signal amplification, wherein the data signal is represented by two phase modulated signal components of constant amplitude in a first part of the LINC amplifier (LINC1, LINC2) located in the transmitting device (BS), at least one of the two phase modulated signal components of constant amplitude is transmitted over at least one optical connection (OF1, OF2, OF4) from the transmitting device (BS) to the receiving device (RAH1), and the at least one of the two phase modulated signal components of constant amplitude is converted from an optical signal into an electrical signal in at least one opto-electrical converter (OE1, OE2) located in said receiving device (RAH1), a LINC amplifier, a transmitting device, a receiving device, and a communication network therefor.

14 Claims, 6 Drawing Sheets

Figure 1:
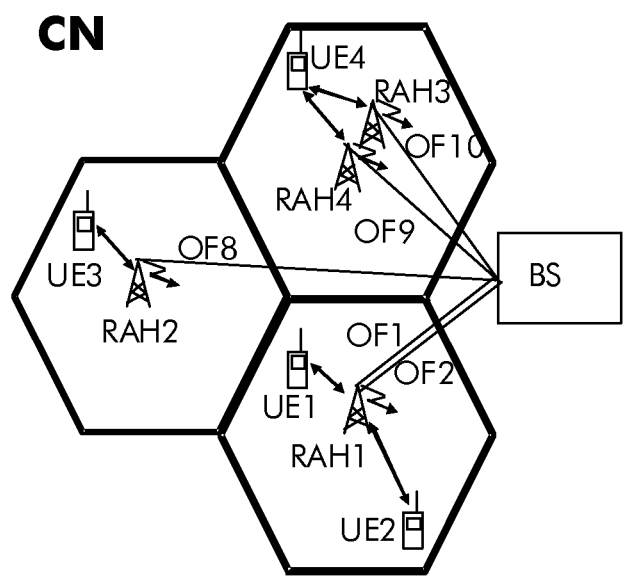

(51) Int. Cl.
  *H04B 10/50* (2013.01)
  *H04B 10/60* (2013.01)
  *H04L 12/801* (2013.01)
  *H04L 12/26* (2006.01)
  *H04L 12/823* (2013.01)
  *H04W 28/12* (2009.01)

(52) U.S. Cl.
  CPC ............ *H04L 47/115* (2013.01); *H04L 47/14* (2013.01); *H04L 47/32* (2013.01); *H04L 47/35* (2013.01); *H04W 28/12* (2013.01); *H04B 10/25752* (2013.01); *H04B 10/25753* (2013.01); *H04B 10/25758* (2013.01); *H04B 10/25759* (2013.01); *H04L 43/16* (2013.01)

(56) References Cited

U.S. PATENT DOCUMENTS

| | | | |
|---|---|---|---|
| 6,054,894 | A | 4/2000 | Wright et al. |
| 2002/0047745 | A1* | 4/2002 | Kolanek ................ 330/149 |
| 2005/0152695 | A1* | 7/2005 | Sulzberger et al. ........... 398/59 |
| 2007/0292142 | A1 | 12/2007 | Hashimoto et al. |
| 2007/0293142 | A1 | 12/2007 | Dehmas et al. |
| 2008/0063397 | A1 | 3/2008 | Hu et al. |
| 2010/0226304 | A1 | 9/2010 | Shoji |
| 2012/0039603 | A1 | 2/2012 | Wiegner et al. |

FOREIGN PATENT DOCUMENTS

| | | |
|---|---|---|
| JP | 2001-244883 | 9/2001 |
| JP | 2002-238071 | 8/2002 |
| JP | 2003-209447 | 7/2003 |
| JP | 2004-312150 | 11/2004 |
| JP | 2005-079855 | 3/2005 |
| JP | 2007-174147 | 7/2007 |
| JP | 2007-174148 | 7/2007 |
| JP | 2008-072714 | 3/2008 |
| JP | 2008-124910 | 5/2008 |
| WO | WO 01/99271 A2 | 12/2001 |
| WO | WO 2005/091532 | 9/2005 |
| WO | WO 2007/015552 | 2/2007 |

OTHER PUBLICATIONS

El-Asmar, et al., "Efficiency improvement of Chireix Power Amplifier with OFDM signals", Ecole de technologie superieure—1100 Notre-Dame St. West, Montreal, Canada H3C 1K3, date unknown.*
International Search Report for PCT/EP2010/054958 dated May 12, 2010.
Chinese Office Action dated Feb. 28, 2014.
Japanese Office Action dated Jan. 29, 2013.
Woo, et al., "SDR Transmitter Based on LINC Amplifier with Bias Control", TH5B-3, IEEE MTT-S Digest, 2003, pp. 1703-1706.
Cox, et al., "A VHF Implementation of LINC Amplifer", Concise Papers, IEEE Transactions on Communications, Sep. 1976, pp. 1018-1022.
Hung, et al., "CMOS Outphasing Class-D Amplifier with Chireix Combiner", IEEE Microwave and Wireless Components Letters, vol. 17, No. 8, Aug. 2007, pp. 619-621.

* cited by examiner

METHOD FOR DATA TRANSMISSION USING A LINC AMPLIFIER, A LINC AMPLIFIER, A TRANSMITTING DEVICE, A RECEIVING DEVICE, AND A COMMUNICATION NETWORK THEREFOR

The invention relates to a method for transmission of a data signal, a LINC amplifier, a transmitting device, a receiving device, and a communication network.

The coverage of a certain service area in a cellular radio network is provided by several radio base stations, which are connected to a core network to serve connections to and from mobile users within the service area. A radio base station contains a baseband unit and at least one antenna unit. In order to increase radio coverage and capacity, modern base stations use several sector antennas.

In order to increase flexibility of the base stations, it is desirable to allow the antennas to be located remote from the baseband unit. This has lead to the development of active antenna systems which are also termed remote antenna heads. Typically, one remote antenna head contains one sector antenna, but there are also systems known, which have remote antenna heads with more than only one sector antenna.

The base stations are preferably connected with the remote antenna heads by means of optical fibers. Conventional radio-over-fiber scenarios involve optical transmission of analogue signals between a base station and a transmitter with an amplifier in a remote antenna head.

An example for the implementation of a radio-over-fiber concept in a cellular radio network using a two-fiber-ring is given in the European patent EP 1553791 B1.

However, the quality of the optical transmission suffers severely from noise, non-linearities, like e.g. chromatic dispersion, and attenuation effects. Consequently the technical implementations for radio-over-fiber concepts must involve highly sophisticated optical modulation techniques and signal conditioning.

Basically, the optical transmission of analogue radio frequency signals involves high electronic efforts for signal modulation techniques and signal conditioning. Indeed, e.g. the method of intensity modulation and direct detection is straightforward, simple and allows for fairly linear optical transmission properties, but on the other hand it requires costly modulators and modulator drivers in order to meet the requirements for analogue radio frequency transmission. In case double side band modulation is used, chromatic dispersion will result in frequency and length dependent suppression of radio frequency power, which will deteriorate the transmission quality.

The object of the invention is thus to propose a cost-effective and fault-tolerant method for transmission of signals from a transmitting device to at least one receiving device using a power amplifier for signal amplification with an optical connection between the transmitting device and the at least one receiving device.

This object is achieved by a method, a LINC amplifier, a transmitting device, a receiving device, and a communication network.

As mobile communication systems like e.g. Universal Mobile Telecommunications System (UMTS), Worldwide Interoperability for Microwave Access (WIMAX), or Third Generation Partnership Project Long Term Evolution (3GPP LTE) require power amplifiers with high output power at frequencies up to 2.6 GHz, preferably so-called LINC amplifiers (LINC=linear amplification by nonlinear components) are used for signal amplification, as they feature a high degree of linearity and efficiency.

In said LINC amplifiers, the input data signal is split into two constant envelope phase modulated signal components. Subsequently each signal is amplified by a power amplifier. The constant envelope signals allow for designing both power amplifiers optimally for high efficiency. After amplification both signals are recombined by means of a suited combiner, as e.g. a Chireix or Wilkinson combiner, in order to produce an amplified replica of the original amplitude and phase modulated input data signal.

The main idea of the invention is the realization of a superior radio-over-fiber architecture by dividing the LINC amplifier into two remote parts connected by at least one optical connection. As digital signals are more fault-tolerant against interferences than analogue signals, preferably digital optical signals are transmitted over the at least one optical connection.

According to the invention, a data signal is represented by two phase modulated signal components of constant amplitude in a first part of a LINC amplifier located in a transmitting device, at least one of the two phase modulated signal components of constant amplitude is converted from an electrical signal into an optical signal in at least one electro-optical converter located in the transmitting device, the at least one of the two phase modulated signal components of constant amplitude is transmitted over at least one optical connection from the transmitting device to at least one receiving device, the at least one of the two phase modulated signal components of constant amplitude is converted from an optical signal into an electrical signal in at least one opto-electrical converter located in said at least one receiving device, and the two phase modulated signal components of constant amplitude are amplified and combined in a second part of the LINC amplifier that is located in said at least one receiving device.

For transmission of signals from a base station via at least one remote antenna head to a user terminal, a LINC amplifier for signal amplification is used, and the signals are transmitted over said at least one optical connection from the base station to the at least one remote antenna head.

This concept enables new architectures which easily reduce costs and hardware effort, and moreover it allows for easy scaling e.g. in beamforming and MIMO applications.

In order to enable transmission of digital optical signals over the at least one optical connection, at least one of the constant envelope phase modulated signal components needs to be converted to digital electrical domain before passing them to at least one suitable electro-optical converter. This is facilitated by the constant amplitude of the two constant envelope phase modulated signal components.

Further developments of the invention can be gathered from the dependent claims and the following description.

In the following the invention will be explained further making reference to the attached drawings.

FIG. 1 schematically shows a cellular communication network with a base station and remote antenna heads in which the invention can be implemented.

Figure 2:
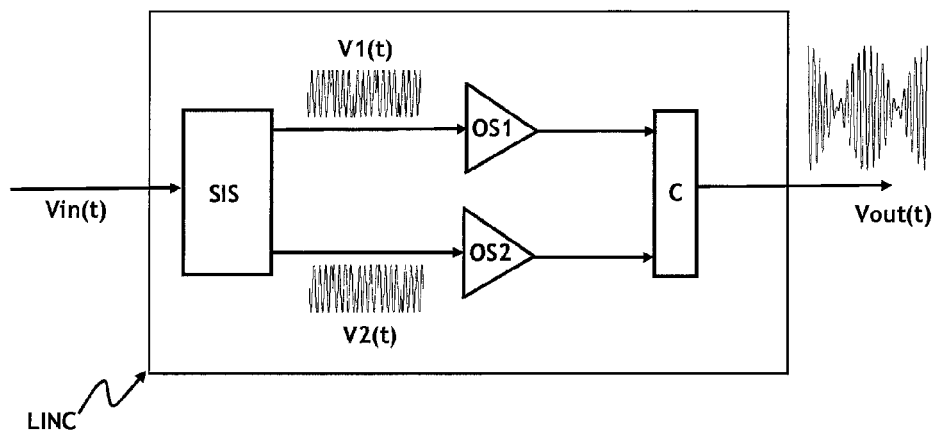

FIG. 2 schematically shows a LINC amplifier architecture according to the state-of-the-art.

Figure 3:
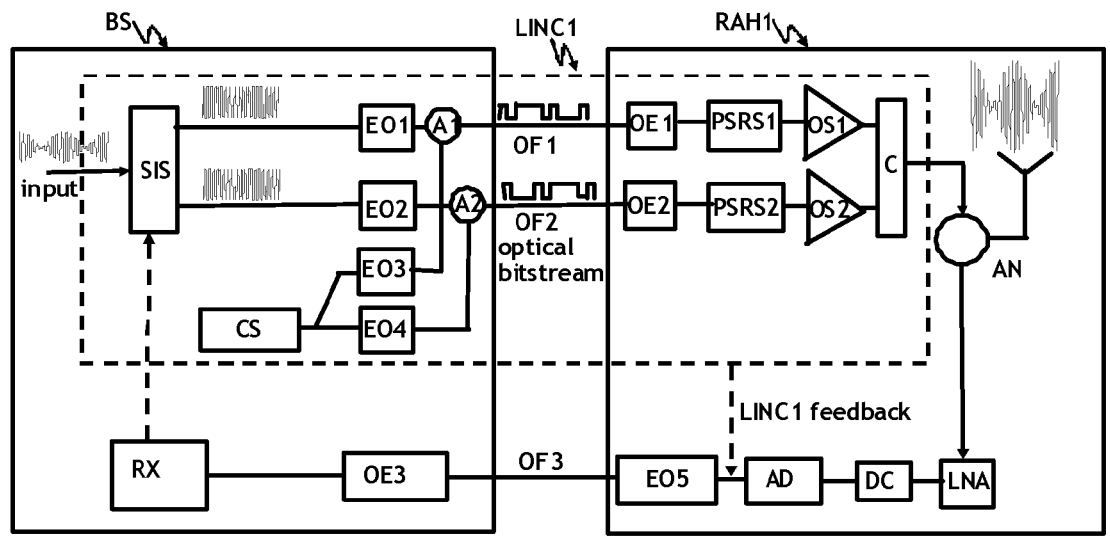

FIG. 3 schematically shows a transmitter and a receiver with a distributed LINC amplifier according to the invention.

Figure 4:
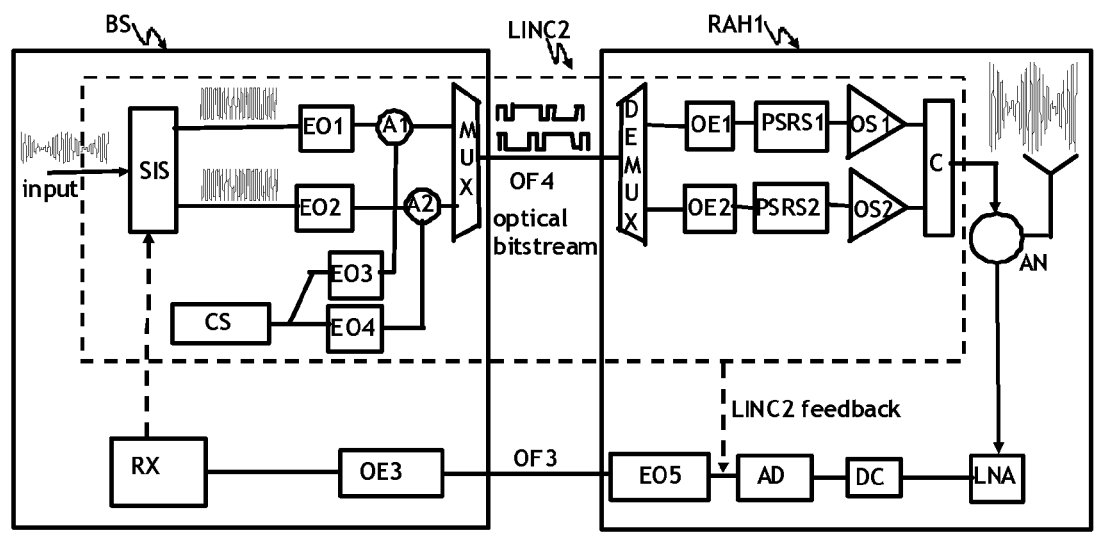

FIG. 4 schematically shows a transmitter and a receiver with a distributed LINC amplifier applying the principles of optical multiplexing and demultiplexing according to the invention.

Figure 5:
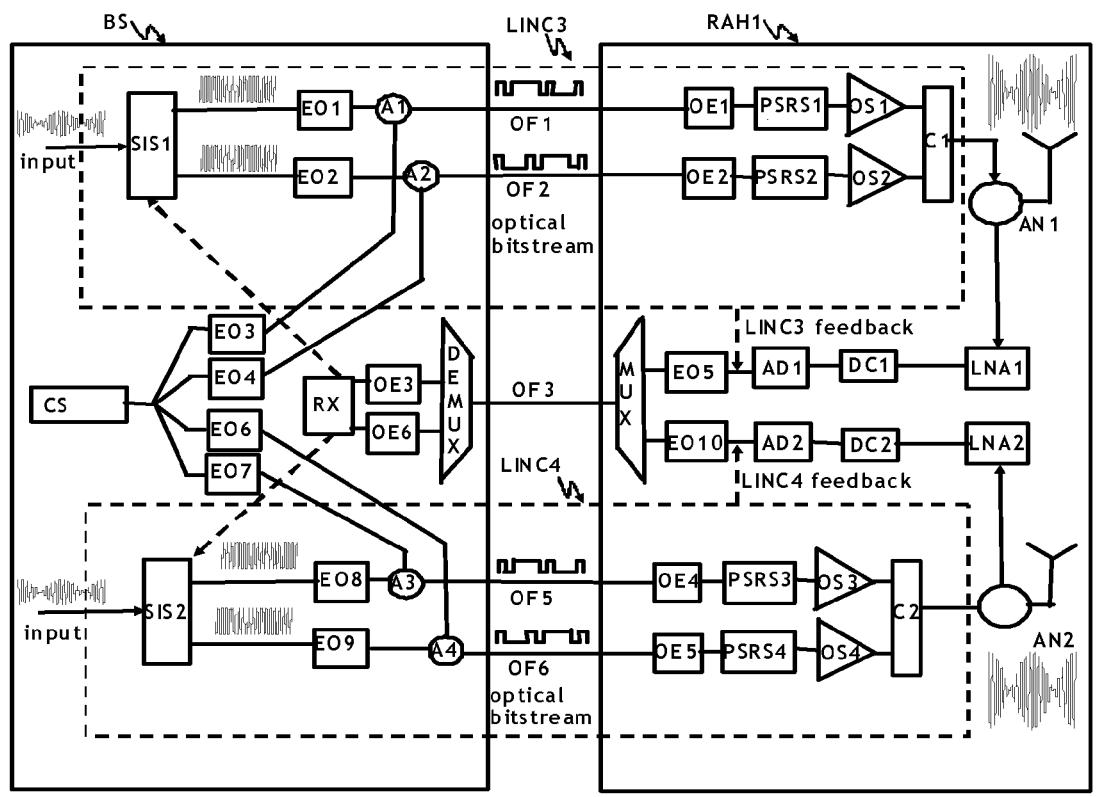

FIG. 5 schematically shows a transmitter and a receiver with two distributed LINC amplifiers and two antennas for demonstration of scaling according to the invention.

Figure 6:
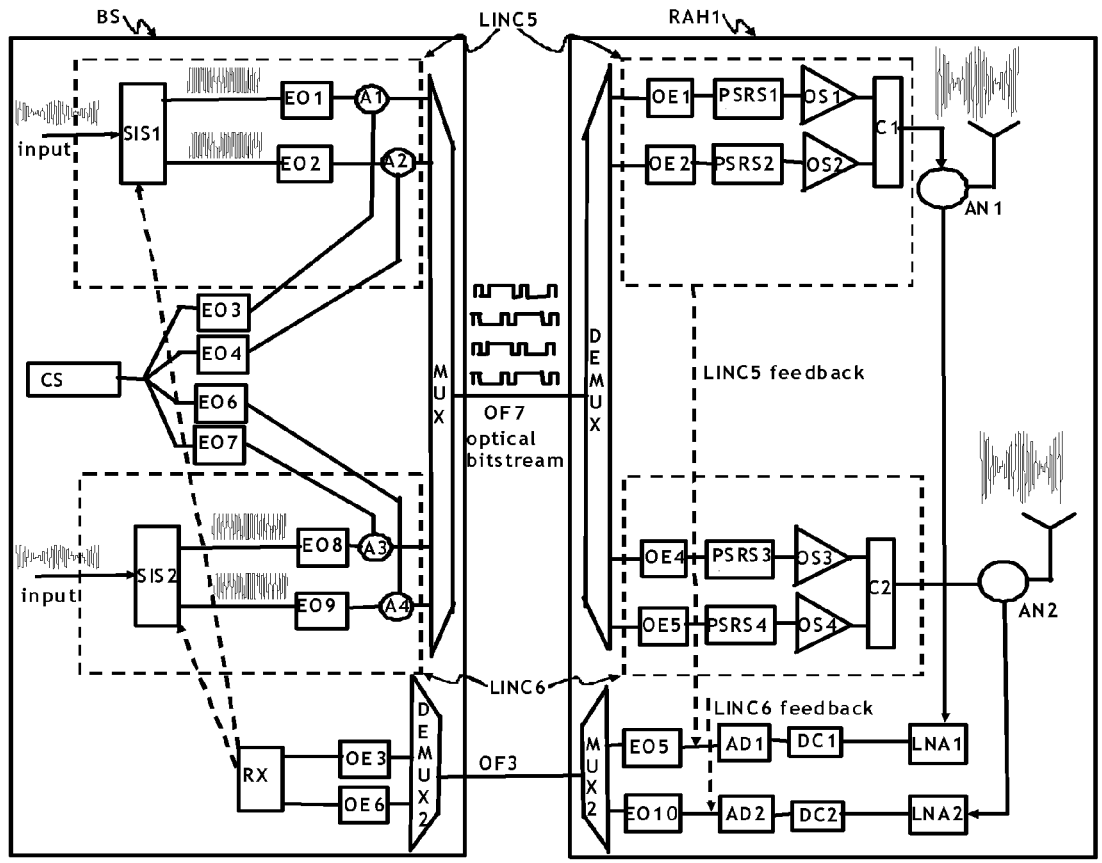

FIG. 6 schematically shows a transmitter and a receiver with two distributed LINC amplifiers and two antennas applying the principles of optical multiplexing and demultiplexing for demonstration of scaling according to the invention.

The principle structure of a communication network CN for signal transmission and reception in which the invention can be implemented is shown in FIG. 1. The communication network CN comprises a base station BS, remote antenna heads RAH1-RAH4 and user terminals UE1-UE4.

Each of said remote antenna heads RAH1-RAH4 is connected to the base station BS by means of an optical connection, as e.g. an optical fiber or an optical free-space connection, OF1, OF2, OF8, OF9 and OF10 respectively. Each of said user terminals UE1-UE4 is connected to one or multiple of said remote antenna heads RAH1-RAH4, which is symbolized by double arrows in FIG. 1. The base station BS is in turn connected to a core network, which is not shown in FIG. 1 for the sake of simplicity.

For amplification of signals that shall be transmitted from the base station BS via a remote antenna head RAH1-RAH4 to a user terminal UE1-UE4, LINC amplifiers according to the state-of-the-art that are located in the remote antenna heads RAH1-RAH4 can be used.

FIG. 2 schematically shows a LINC amplifier according to the state-of-the-art.

An input of the LINC amplifier, e.g. for input of baseband, intermediate frequency or radio frequency (RF) signals Vin (t), is connected to an input of a signal separator SIS.

A first output of the signal separator SIS is connected to an input of a first output stage OS1. A second output of the signal separator SIS is connected to an input of a second output stage OS2.

An output of the first output stage OS1 is connected to a first input of a combiner C, and an output of the second output stage OS2 is connected to a second input of the combiner C.

An output of the combiner C is provided to output an amplified signal Vout(t).

In a method for signal amplification using a LINC amplifier according to the state-of-the-art as shown in FIG. 2, an analogue input signal Vin(t) is sent to the input of the LINC amplifier and thus to the input of the signal separator SIS. In the signal separator SIS, the input signal Vin(t) is split into two phase modulated signal components of constant amplitude. In other words, the amplitude modulation of the input signal Vin(t) is converted into phase modulations of two signals V1(t) and V2(t) with constant envelope as in the following:

$$Vin(t) = A(t)\cos(\omega t + \theta(t)) = V1(t) + V2(t)$$

$$V1(t) = \frac{A}{2}(\sin(\omega t + \theta(t) + \phi(t)))$$

$$V2(t) = \frac{A}{2}(\sin(\omega t + \theta(t) - \phi(t)))$$

$$\phi(t) = \sin^{-1}\frac{A(t)}{A}$$

In the formulas above, $\omega$ is the frequency, $\theta(t)$ is the instantaneous phase variation, and A is the maximum value of A(t).

The first phase modulated signal component of constant amplitude V1(t) is applied at the input of the first output stage OS1 and amplified in said first output stage OS1. At the output of the first output stage OS1, an amplified copy of the first phase modulated signal component of constant amplitude V1(t) is provided for input at the first input of the combiner C.

The second phase modulated signal component of constant amplitude V2(t) is applied at the input of the second output stage OS2 and amplified in said second output stage OS2. At the output of the second output stage OS2, an amplified copy of the second phase modulated signal component of constant amplitude V2(t) is provided for input at the second input of the combiner C.

In the combiner C, the amplified copy of the first phase modulated signal component of constant amplitude V1(t) is combined with the amplified copy of the second phase modulated signal component of constant amplitude V2(t) resulting in an amplified copy of the input signal Vin(t). Said amplified copy of the input signal Vin(t) is provided at the output of the combiner C as output signal Vout(t) of the LINC amplifier.

In the following, the application of LINC amplifiers in four embodiments of the invention is depicted. The basic idea of all four embodiments is to generate phase modulated signal components of constant amplitude in a first part of a LINC amplifier located in a transmitting device, to transmit at least one of said phase modulated signal components of constant amplitude via an optical connection to a second part of the LINC amplifier located in a receiving device, and to amplify and combine the phase modulated signal components of constant amplitude in the second part of the LINC amplifier.

An embodiment of a LINC amplifier LINC1 according to the invention is depicted in FIG. 3. The LINC amplifier LINC1 is indicated as a dashed box and comprises a signal separator, a carrier synthesizer CS, four electro-optical converters EO1-EO4, two optical adders A1 and A2, two opto-electrical converters OE1 and OE2, two phase signal re-synthesizers PSRS1 and PSRS2, two switched output stages OS1 and 052, and a combiner C.

In the embodiment depicted in FIG. 3, the signal separator, the carrier synthesizer CS, the four electro-optical converters EO1-EO4, and the two optical adders A1 and A2 are comprised in a base station BS, which is indicated as a box, and the two opto-electrical converters OE1 and OE2, the two phase signal re-synthesizers PSRS1 and PSRS2, the two switched output stages OS1 and 052, and the combiner C are comprised in a remote antenna head RAH1, which is also indicated as a box.

The base station BS further comprises a third opto-electrical converter OE3 and a receiver RX.

The remote antenna head RAH1 further comprises an antenna network AN, a low noise amplifier LNA, a down converter DC, an analogue to digital converter AD2 and a fifth electro-optical converter EO5.

An input for intermediate frequency signals of the LINC amplifier LINC1 is connected to an input of the signal separator SIS.

A first output of the signal separator SIS is connected to an input of the first electro-optical converter EO1.

An output of the first electro-optical converter EO1 is connected to a first input of the first optical adder A1 through an optical connection, and an output of the first optical adder A1 is connected to an input of the first opto-electrical converter OE1 through an optical connection OF1, as e.g. an optical fiber or an optical free-space connection.

An output of the first opto-electrical converter OE1 is connected to an input of the first phase signal re-synthesizer PSRS1, and an output of the first phase signal re-synthesizer PSRS1 is connected to an input of the first output stage OS1.

An output of the first output stage OS1 is connected to a first input of the combiner C.

A second output of the signal separator SIS is connected to an input of the second electro-optical converter EO2.

An output of the second electro-optical converter EO2 is connected to a first input of the second optical adder A2 through an optical connection, and an output of the second optical adder A2 is connected to an input of the second opto-electrical converter OE2 through an optical connection OF2, as e.g. an optical fiber or an optical free-space connection.

An output of the second opto-electrical converter OE2 is connected to an input of the second phase signal re-synthesizer PSRS2, and an output of the second phase signal re-synthesizer PSRS2 is connected to an input of the second output stage OS2.

An output of the second output stage OS2 is connected to a second input of the combiner C.

An output of the carrier synthesizer CS is connected both to an input of the third electro-optical converter EO3 and to an input of the fourth electro-optical converter EO4.

An output of the third electro-optical converter EO3 is connected to a second input of the first optical adder A1 through an optical connection, and an output of the fourth electro-optical converter EO4 is connected to a second input of the second optical adder A2 through an optical connection.

In an embodiment of the invention, the output of the carrier synthesizer CS is connected to an input of only one electro-optical converter, and the output of the electro-optical converter is connected both to the second input of the first optical adder A1 through an optical connection, and to the second input of the second optical adder A2 through an optical connection.

An output of the combiner C is connected to the antenna network AN.

In an embodiment of the invention, a further device for signal conditioning, as e.g. a filter, an equalizer or a pre-amplifier, is comprised in the signal paths between the electro-optical converters EO1-EO4 and the opto-electrical converters OE1 and OE2 respectively, or in the signal paths between the opto-electrical converters OE1 and OE2 and the output stages OS1 and OS2 respectively.

In a reception path, an output of the antenna network AN is connected to an input of the low noise amplifier LNA, and an output of the low noise amplifier LNA is connected to an input of the down converter DC.

An output of the down converter DC is connected to an input of the analogue-to-digital converter AD, and an output of the analogue-to-digital converter AD is connected to an input of the fifth electro-optical converter EO5.

An output of the fifth electro-optical converter EO5 is connected to an input of the third opto-electrical converter OE3 through an optical connection OF3 as e.g. an optical fiber or an optical free-space connection.

The output of the third opto-electrical converter OE3 is in turn connected to an input of the receiver RX.

In an embodiment of the invention, an output of the LINC amplifier LINC1 is connected to the reception path, preferably at an input of the fifth electro-optical converter EO5, which is indicated by a dotted arrow in FIG. 3, e.g. for linearization and optimization purposes.

Preferably, said electro-optical converters EO1-EO5 each comprise a laser diode which is either directly modulated or externally modulated e.g. by means of a electroabsorption or lithiumniobate modulator.

Preferably, said opto-electrical converters OE1-OE3 each comprise a so-called PIN-diode or a so-called avalanche-photodiode.

In the embodiment depicted in FIG. 3, an analogue data signal on an intermediate frequency $f_{if}$ preferably in the frequency range 10-100 MHz is sent to the input of the LINC amplifier LINC1 and thus to the input of the signal separator SIS. In the signal separator SIS, the analogue data signal is split into two phase modulated signal components of constant amplitude.

The two phase modulated signal components of constant amplitude are converted from analogue to digital signals in the signal separator SIS.

In another embodiment of the invention, the conversion from analogue to digital signals is not performed in the signal separator SIS, but in an analogue-to-digital converter which is located in the signal path between the signal separator SIS and the electro-optical converter EO1 and EO2 respectively.

The first phase modulated signal component of constant amplitude is sent to the to the first electro-optical converter EO1 for converting digital electrical signals into digital optical signals using an optical source with $f_{optical}$ being the frequency of the light of the optical source, so that the first digital optical phase modulated signal component has a frequency $f_{os} = f_{optical} \pm f_{if}$.

From the output of the first electro-optical converter EO1, the first digital optical phase modulated signal component is sent over the optical connection to the first input of the first adder A1.

The second phase modulated signal component of constant amplitude is sent to the to the second electro-optical converter EO2 for converting digital electrical signals into digital optical signals using an optical source with $f_{optical}$ being the frequency of the light of the optical source, so that the second digital optical phase modulated signal component has a frequency $f_{os} = f_{optical} \pm f_{if}$.

From the output of the second electro-optical converter EO2, the second digital optical phase modulated signal component is sent over the optical connection to the first input of the second adder A2.

In the carrier synthesizer CS, a radio frequency carrier signal on a radio frequency $f_{rf}$ preferably in the frequency range of several hundreds of MHz to several GHz is generated. The radio frequency carrier signal is sent to the third and fourth electro-optical converter EO3 and EO4 for converting the electrical radio frequency carrier signal into an optical radio frequency carrier signal using an optical source with $f_{optical}$ being the frequency of the light of the optical source, so that the optical radio frequency carrier signal has a frequency $f_{orf} = f_{optical} \pm f_{rf}$.

From the output of the third and fourth electro-optical converter EO3 and EO4, the optical radio frequency carrier signal is sent over optical connections to the second input of the first adder A1 and the second adder A2 respectively.

In the first adder A1, the first digital optical phase modulated signal component is added with the optical radio frequency carrier signal, i.e. the first digital optical phase modulated signal component with the frequency $f_{os} = f_{optical} \pm f_{if}$ is summed up with the optical radio frequency carrier signal with the frequency $f_{orf} = f_{optical} \pm f_{rf}$, which results in first combined optical data signals.

From the output of the first adder A1, the first combined optical data signals are sent over the optical connection OF1 to the input of the first opto-electrical converter OE1.

In the first opto-electrical converter OE1, the principle of optical heterodyning is applied, and the first digital optical phase modulated signal component is upconverted into a first digital electrical phase modulated signal component. The intensity of the detected first digital electrical phase modulated signal component varies with a frequency $f_{des} = f_{rf} \pm f_{if}$, as all higher frequency components of the intensity in the range of $f_{optical}$ are time averaged in the first opto-electrical converter OE1. The first digital electrical phase modulated signal component is sent from the output of the first opto-electrical converter OE1 to an input of the first phase signal re-synthesizer PSRS1 in which the analogue first phase modulated signal component of constant amplitude is recovered.

The first phase modulated signal component of constant amplitude is sent from the output of the first phase signal re-synthesizer PSRS1 to the input of the first output stage OS1, which leads to an amplified copy of the first phase modulated signal component of constant amplitude at the output of the first output stage OS1.

In an embodiment of the invention, the analogue first phase modulated signal component of constant amplitude is recovered by means of implicit passive signal reconstruction filtering in the first output stage OS1, and no first phase signal re-synthesizer PSRS1 is needed.

The amplified copy of the first phase modulated signal component of constant amplitude is sent to the first input of the combiner C.

In the second adder A2, the second digital optical phase modulated signal component is added with the optical radio frequency carrier signal, i.e. the second digital optical phase modulated signal component with the frequency $f_{os} = f_{optical} \pm f_{if}$ is summed up with the optical radio frequency carrier signal with the frequency $f_{orf} = f_{optical} \pm f_{rf}$, which results in second combined optical data signals.

From the output of the second adder A2, the second combined optical data signals are sent over the optical connection OF2 to the input of the second opto-electrical converter OE2.

In the second opto-electrical converter OE2, the principle of optical heterodyning is applied, and the second digital optical phase modulated signal component is upconverted into a second digital electrical phase modulated signal component. The intensity of the detected second digital electrical phase modulated signal component varies with a frequency $f_{des} = f_{rf} \pm f_{if}$, as all higher frequency components of the intensity in the range of $f_{optical}$ are time averaged in the second opto-electrical converter OE2. The second digital electrical phase modulated signal component is sent from the output of the second opto-electrical converter OE2 to an input of the second phase signal re-synthesizer PSRS2 in which the analogue second phase modulated signal component of constant amplitude is recovered.

The second phase modulated signal component of constant amplitude is sent from the output of the second phase signal re-synthesizer PSRS2 to the input of the second output stage OS2, which leads to an amplified copy of the second phase modulated signal component of constant amplitude at the output of the second output stage OS2.

In an embodiment of the invention, the analogue second phase modulated signal component of constant amplitude is recovered by means of implicit passive signal reconstruction filtering in the second output stage OS2, and no second phase signal re-synthesizer PSRS2 is needed.

The amplified copy of the second phase modulated signal component of constant amplitude is sent to the second input of the combiner C.

In the combiner C, the amplified copy of the first phase modulated signal component of constant amplitude is combined with the amplified copy of the second phase modulated signal component of constant amplitude resulting in an upconverted and amplified copy of the analogue data signal provided at the input of the LINC amplifier LINC1. Said amplified copy of the analogue data signal is provided at the output of the combiner C as output signal of the LINC amplifier LINC1.

The upconverted and amplified copy of the analogue data signal is sent to the antenna network AN for transmission over an air interface.

In the reception path, analogue electrical signals are sent from the antenna network AN to the low noise amplifier LNA for signal amplification.

The amplified analogue electrical signals are sent to the down converter DC in which the signals are downconverted from the radio frequency to the intermediate frequency.

The downconverted analogue electrical signals are sent to the analogue-to-digital converter AD for digitalization, and the digital electrical signals are sent to the fifth electro-optical converter EO5 for converting the digital electrical signals into digital optical signals.

The digital optical signals are sent from the fifth electro-optical converter EO5 to the third opto-electrical converter OE3 through the optical connection OF3.

In the third opto-electrical converter OE3, the digital optical signals are back-converted into digital electrical signals and sent to the receiver RX for further processing.

In an embodiment of the invention, if linearization of the LINC amplifier LINC1 should become necessary, an output signal of the LINC amplifier LINC1 is fed back via the fifth electro-optical converter EO5 and the optical connection OF3 to the base station BS, and based on said fed back output signal, the LINC amplifier LINC1 is controlled, which is indicated by a dotted arrow between the receiver RX and the signal separator SIS.

Advantages of the above described embodiment of the invention are, that by using optical heterodyning, the need for electrical upconversion is dropped, and the signal processing related to the phase modulated signal components of constant amplitude is performed on an intermediate frequency level at considerably reduced speed and hence reduced power dissipation and chip complexity.

However, the application of optical heterodyning is not mandatory for the invention. Thus, in an embodiment of the invention, the phase modulated signal components of constant amplitude are electrically upconverted before they are sent to the first and second electro-optical converters EO1 and EO2 respectively, and the digital optical phase modulated signal components are sent directly over an optical connection to the first and second opto-electrical converters OE1 and OE2 respectively. As a consequence, the carrier synthesizer CS, the third and fourth electro-optical converters EO3 and EO4, and the adders A1 and A2 are not necessary in this embodiment.

In principle, it is not necessary for the application of the invention that both phase modulated signal components of constant amplitude are transmitted as an optical signal from the base station BS to the remote antenna head RAH1, i.e. it is possible that either the first phase modulated signal component of constant amplitude or the second phase modulated signal component of constant amplitude is transmitted electrically from the base station BS to the remote antenna head RAH1. Thus, in embodiments of the invention, either only the first phase modulated signal component of constant amplitude or only the second phase modulated signal component of constant amplitude is transmitted optically from the base station BS to the remote antenna head RAH1.

In an embodiment of the invention, the analogue data signal which is sent to the input of the LINC amplifier LINC1 is not on an intermediate frequency, but on a baseband frequency.

In the embodiment depicted in FIG. 4, a distributed LINC amplifier LINC2 applying the principles of optical multiplexing and demultiplexing according to the invention is shown.

The basic structure of the distributed LINC amplifier LINC2 is similar to the structure of the distributed LINC amplifier LINC1 depicted in FIG. 3 and described above. Thus, in the following only the differences compared to the distributed LINC amplifier LINC1 depicted in FIG. 3 are described.

The distributed LINC amplifier LINC2 depicted in FIG. 4 comprises an optical multiplexer MUX which is located in the base station BS and an optical demultiplexer DEMUX which is located in the remote antenna head RAH1.

The output of the first optical adder A1 is connected to a first input of the optical multiplexer MUX through an optical connection.

The output of the second optical adder A2 is connected to a second input of the optical multiplexer MUX through an optical connection, and an output of the optical multiplexer MUX is connected to an input of the optical demultiplexer DEMUX through an optical connection OF4.

A first output of the optical demultiplexer DEMUX is connected through an optical connection to the input of the first opto-electrical converter OE1, and a second output of the optical demultiplexer DEMUX is connected through an optical connection to the input of the second opto-electrical converter OE2.

In the embodiment depicted in FIG. 3, the first and second optical phase modulated signal components of constant amplitude are transmitted over separate optical connections OF1 and OF2 from the base station BS to the remote antenna head RAH1.

In the embodiment depicted in FIG. 4, the first and second optical phase modulated signal components of constant amplitude, and the optical radio frequency carrier signal are multiplexed in the optical multiplexer MUX, and transmitted over the common optical connection OF4 to the optical demultiplexer DEMUX, in which the optical signals are demultiplexed. As optical multiplexing and demultiplexing is applied in this embodiment, the optical frequency that is used for upconversion in the electro-optical converters EO1 and EO3 is different from the optical frequency that is used for upconversion in the electro-optical converters EO2 and EO4. The first optical phase modulated signal component and the respective optical radio frequency carrier signal are sent to the first opto-electrical converter OE1, and the second optical phase modulated signal component and the respective optical radio frequency carrier signal are sent to the second opto-electrical converter OE2.

In the embodiment depicted in FIG. 5, two distributed LINC amplifiers LINC3 and LINC4 each connected to an antenna network AN1 and AN2 respectively and comprised in a base station BS and in a remote antenna head RAH1 are shown for demonstration of scaling according to the invention. The basic structure and function of the distributed LINC amplifiers LINC3 and LINC4 is similar to the structure of the distributed LINC amplifier LINC1 depicted in FIG. 3 and described above. Thus, in the following only the differences compared to the distributed LINC amplifier LINC1 depicted in FIG. 3 are described.

In the embodiment depicted in FIG. 5, a carrier synthesizer CS is used for generation of radio frequency carrier signals for both the upper distributed LINC amplifier LINC3 and the lower distributed LINC amplifier LINC4 instead of having a separate carrier synthesizer for each distributed LINC amplifier LINC3 and LINC4. An output of the carrier synthesizer CS is connected to four inputs of four electro-optical converters EO3, EO4, EO6 and EO7. In further embodiments for multiband application, more than one carrier synthesizer CS is used in order to provide different carrier frequencies.

An output of the electro-optical converter EO3 is connected to an input of the first optical adder A1 of the upper distributed LINC amplifier LINC3, and an output of the electro-optical converter EO4 is connected to an input of the second optical adder A2 of the upper distributed LINC amplifier LINC3.

An output of the electro-optical converter EO6 is connected to an input of the first optical adder A3 of the lower distributed LINC amplifier LINC4, and an output of the electro-optical converter EO7 is connected to an input of the second optical adder A4 of the lower distributed LINC amplifier LINC4.

In an embodiment of the invention, the output of the carrier synthesizer CS is connected to an input of only one electro-optical converter, and the output of the electro-optical converter is connected to inputs of the four optical adders A1-A4 through optical connections.

Each of the two distributed LINC amplifiers LINC3 and LINC4 has a reception path as described above in FIG. 3 with the difference that they have a common optical reception path between the remote antenna head RAH1 and the base station BS performed by optical multiplexing and demultiplexing.

An output of the antenna network AN1 of the upper distributed LINC amplifier LINC3 and an output of the antenna network AN2 of the of the lower distributed LINC amplifier LINC4 are each connected to an input of the respective low noise amplifier LNA1 and LNA2.

In an embodiment of the invention, an output of the upper LINC amplifier LINC3 and an output of the lower LINC amplifier LINC4 are connected to the respective reception path, preferably at an input of the fifth electro-optical converter EO5 and the tenth electro-optical converter EO10 respectively, which is indicated by dotted arrows in FIG. 5. The receiver RX is connected both to the signal separator SIS1 of the upper distributed LINC amplifier LINC3 and to the signal separator SIS2 of the lower distributed LINC amplifier LINC4, which is indicated by two dotted arrows in FIG. 5. Alternatively, the receiver RX is connected to a digital processing unit in which a linearization algorithm is normally performed.

The usage of a common carrier synthesizer CS and a common reception path for both LINC amplifiers LINC 3 and LINC 4 reduces the costs and makes the system scalable for the usage of several antennas applying so-called beamforming or multiple-input-multiple-output.

In an embodiment of the invention, by combining several LINC amplifiers as described in FIG. 5 with a specific radio carrier frequency for each LINC amplifier generated in a specific carrier synthesizer for each LINC amplifier, e.g. multiband coverage or a fragmented transmitter with a dedicated frequency band for signal transmission of each LINC amplifier can be achieved.

In the embodiment depicted in FIG. 6, two distributed LINC amplifiers LINC5 and LINC6 each connected to an antenna network AN1 and AN2 respectively and comprised in a base station BS and in a remote antenna head RAH1 applying the principles of optical multiplexing and demultiplexing are shown for demonstration of scaling according to the invention. The basic structure and function of the distributed LINC amplifiers LINC5 and LINC6 is similar to the structure of the distributed LINC amplifier LINC2 depicted in FIG. 4 and described above. Thus, in the following only the differences compared to the distributed LINC amplifier LINC2 depicted in FIG. 4 are described.

In the embodiment depicted in FIG. 6, a carrier synthesizer CS is used for generation of radio frequency carrier signals for both the upper distributed LINC amplifier LINC5 and the lower distributed LINC amplifier LINC6 instead of having a separate carrier synthesizer for each distributed LINC amplifier LINC5 and LINC6. An output of the carrier synthesizer CS is connected to four inputs of four electro-optical converters EO3, EO4, EO6 and EO7.

An output of the electro-optical converter EO3 is connected to an input of the first optical adder A1 of the upper distributed LINC amplifier LINC5, and an output of the electro-optical converter EO4 is connected to an input of the second optical adder A2 of the upper distributed LINC amplifier LINC5.

An output of the electro-optical converter EO6 is connected to an input of the first optical adder A3 of the lower distributed LINC amplifier LINC6, and an output of the electro-optical converter EO7 is connected to an input of the second optical adder A4 of the lower distributed LINC amplifier LINC6. The base station BS in FIG. 6 comprises an optical multiplexer MUX which is used by both distributed LINC amplifiers LINC5 and LINC6, and the remote antenna head RAH1 comprises an optical demultiplexer DEMUX which is also used by both distributed LINC amplifiers LINC5 and LINC6.

The output of the first optical adder A1 of the upper distributed LINC amplifier LINC5 is connected to a first input of the optical multiplexer MUX through an optical connection, and the output of the second optical adder A2 of the upper distributed LINC amplifier LINC5 is connected to a second input of the optical multiplexer MUX through an optical connection.

The output of the first optical adder A3 of the lower distributed LINC amplifier LINC6 is connected to a third input of the optical multiplexer MUX through an optical connection, and the output of the second optical adder A4 of the lower distributed LINC amplifier LINC6 is connected to a fourth input of the optical multiplexer MUX through an optical connection.

An output of the optical multiplexer MUX is connected to an input of the optical demultiplexer DEMUX through an optical connection OF7.

A first output of the optical demultiplexer DEMUX is connected through an optical connection to the input of the first opto-electrical converter OE1 of the upper distributed LINC amplifier LINC5, and a second output of the optical demultiplexer DEMUX is connected through an optical connection to the input of the second opto-electrical converter OE2 of the upper distributed LINC amplifier LINC5.

A third output of the optical demultiplexer DEMUX is connected through an optical connection to the input of the first opto-electrical converter OE4 of the lower distributed LINC amplifier LINC6, and a second output of the optical demultiplexer DEMUX is connected through an optical connection to the input of the second opto-electrical converter OE5 of the lower distributed LINC amplifier LINC6.

In the embodiment depicted in FIG. 3, the first and second optical phase modulated signal components of constant amplitude are transmitted over separate optical connections OF1 and OF2 from the base station BS to the remote antenna head RAH1.

In the embodiment depicted in FIG. 6, the first and second optical phase modulated signal components of constant amplitude, and the optical radio frequency carrier signal of both LINC amplifiers LINC5 and LINC6 are multiplexed in the optical multiplexer MUX, and transmitted over the common optical connection OF7 to the optical demultiplexer DEMUX, in which the optical signals are demultiplexed.

As optical multiplexing and demultiplexing is applied in this embodiment, the optical frequencies that are used for upconversion in the electro-optical converters EO3, EO4, EO6 and EO7, which correspond to the optical frequencies that are used for upconversion in the electro-optical converters EO1, EO2, EO9 and EO8 respectively are all different from each other.

The first optical phase modulated signal component and the respective optical radio frequency carrier signal of the upper LINC amplifier LINC5 are sent to the first opto-electrical converter OE1 of the upper LINC amplifier LINC5, and the second optical phase modulated signal component and the respective optical radio frequency carrier signal of the upper LINC amplifier LINC5 are sent to the second opto-electrical converter OE2 of the upper LINC amplifier LINC5.

The first optical phase modulated signal component and the respective optical radio frequency carrier signal of the lower LINC amplifier LINC6 are sent to the first opto-electrical converter OE4 of the lower LINC amplifier LINC6, and the second optical phase modulated signal component and the respective optical radio frequency carrier signal of the lower LINC amplifier LINC6 are sent to the second opto-electrical converter OE5 of the lower LINC amplifier LINC6.

The two distributed LINC amplifiers LINC5 and LINC6 have reception paths as described above in FIG. 5.

An output of the antenna network AN1 of the upper distributed LINC amplifier LINC5 and an output of the antenna network AN2 of the of the lower distributed LINC amplifier LINC6 are each connected to an input of the respective low noise amplifier LNA1 and LNA2.

In an embodiment of the invention, an output of the upper LINC amplifier LINC5 and an output of the lower LINC amplifier LINC6 are connected to the respective reception path, preferably at an input of the fifth electro-optical converter EO5 and the tenth electro-optical converter EO10 respectively, which is indicated by dotted arrows in FIG. 6. The receiver RX is connected both to the signal separator SIS1 of the upper distributed LINC amplifier LINC5 and to the signal separator SIS2 of the lower distributed LINC amplifier LINC6, which is indicated by two dotted arrows in FIG. 6. Alternatively, the receiver RX is connected to a digital processing unit in which a linearization algorithm is normally performed.

The usage of a common carrier synthesizer CS, a common multiplexer MUX, a common demultiplexer DEMUX, and a common reception path for both LINC amplifiers LINC 5 and LINC 6 reduces the costs and makes the system scalable for the usage of several antennas applying so-called beamforming or multiple-input-multiple-output.

In an embodiment of the invention, by combining several LINC amplifiers as described in FIG. 6 with a specific radio carrier frequency for each LINC amplifier, e.g. multiband coverage or a fragmented transmitter with a dedicated frequency band for signal transmission of each LINC amplifier can be achieved.

In a further embodiment of the invention, signals from the base station BS are transmitted through at least two optical connections OF9, OF10 via at least two remote antenna heads RAH3, RAH4 to a user terminal UE4 applying so-called beamforming or multiple-input-multiple-output procedures, as depicted in FIG. 1 for the case of two remote antenna heads RAH3 and RAH4 that are used for signal transmission to the user terminal UE4.

In the embodiments described above, analogue data signals are provided at the input of the LINC amplifiers LINC1-LINC6. However, in further preferred embodiments, the input data signal provided at the input of the LINC amplifiers LINC1-LINC6 respectively is a digital signal, as e.g. a so-called I or Q value provided from a digital processing unit on a baseband frequency. In the signal separator SIS, the digital data signal is split into two digital phase modulated signal components of constant amplitude. In embodiments using digital input data signals, no conversion from analogue to digital signals in the signal separator SIS as described in the embodiments using analogue input data signals is necessary, but instead a dedicated signal processing must be performed.

In embodiments using digital input data signals, the signal separator SIS is preferably implemented in a field programmable gate array (FPGA), but could also be implemented in an application-specific integrated circuit (ASIC).

Such a LINC amplifier according to the invention can be used e.g. for a communication network applying the standard Universal Mobile Telecommunications System, Third Generation Partnership Project Long Term Evolution, or Worldwide Interoperability for Microwave Access.

In the embodiments above, the invention is described for the transmission of signals from a base station BS via at least one remote antenna head RAH1 to a user terminal UE1, however the invention is also applicable for transmission of signals from an arbitrary transmitting device to an arbitrary receiving device, as e.g. used in a point-to-point radio system or used for connection of devices within a rack.

The invention claimed is:

1. A method for transmission of a data signal from a transmitting device to at least one receiving device using a LINC amplifier for signal amplification, the method comprising:
   representing the data signal by two phase modulated signal components of constant amplitude in a first part of the LINC amplifier located in the transmitting device;
   converting the two phase modulated signal components of constant amplitude from electrical signals into optical signals in at least one electro-optical converter located in the transmitting device;
   transmitting both phase modulated signal components of constant amplitude from the transmitting device to the at least one receiving device, with the two phase modulated signal components of constant amplitude being transmitted over two optical connections from the transmitting device to the at least one receiving device;
   converting the two phase modulated signal components of constant amplitude from optical signals into electrical signals in at least one opto-electrical converter located in said at least one receiving device; and
   amplifying and combining the two phase modulated signal components of constant amplitude in a second part of the LINC amplifier that is located in said at least one receiving device.

2. The method according to claim 1, further comprising:
   converting the two phase modulated signal components of constant amplitude from analogue electrical signals to digital electrical signals in the transmitting device;
   transmitting the two phase modulated signal components of constant amplitude as digital optical signals over the two optical connections; and
   converting the two phase modulated signal components of constant amplitude from digital electrical signals to analogue electrical signals in the receiving device.

3. The method according to claim 1, further comprising:
   converting a radio frequency carrier signal from an electrical signal into an optical radio frequency carrier signal in a further electro-optical converter in the transmitting device;
   adding at least one of the two phase modulated signal components of constant amplitude with the optical radio frequency carrier signal resulting in a combined optical signal;
   converting the combined optical signal from an optical signal into an electrical signal in an opto-electrical converter in said at least one receiving device;
   upconverting at least one of the two phase modulated signal components of constant amplitude to radio frequency domain by multiplication with the optical radio frequency carrier signal applying optical heterodyning in the opto-electrical converter.

4. The method according to claim 1, further comprising:
   feeding back an output signal of the LINC amplifier to the transmitting device;
   controlling the LINC amplifier based on said fed back output signal.

5. The method according to claim 1, wherein said transmitting device comprises a base station and said at least one receiving device comprises a remote antenna head, and said data signal is transmitted from the base station via the at least one remote antenna head to a user terminal.

6. The method according to claim 5, wherein data signals from the base station are transmitted via at least two remote antenna heads to a user terminal applying beamforming or multiple-input-multiple-output.

7. The method according to claim 1, further comprising:
   converting the two phase modulated signal components of constant amplitude from electrical signals into optical signals in electro-optical converters in the transmitting device;
   optically multiplexing the two phase modulated signal components of constant amplitude in an optical multiplexer located in the transmitting device;
   transmitting the two phase modulated signal components of constant amplitude over one optical connection from the transmitting device to an optical demultiplexer located in the at least one receiving device; and
   optically demultiplexing the two phase modulated signal components of constant amplitude in the optical demultiplexer.

8. A LINC amplifier comprising:
   a first part of the LINC amplifier located in a transmitting device comprises a first signal path configured to receive a first phase modulated signal component of constant amplitude, a second signal path configured to receive a second phase modulated signal component of constant amplitude, and at least one electro-optical converter configured to convert the two phase modulated signal components of constant amplitude from electrical signals into optical signals;
   a second part of the LINC amplifier located in a receiving device comprises at least one opto-electrical converter configured to convert the two phase modulated signal components of constant amplitude from optical signals into electrical signals, a first output stage configured to amplify the first phase modulated signal component, a second output stage configured to amplify the second phase modulated signal component, and a combiner configured to combine the two amplified phase modulated signal components of constant amplitude,
   wherein said first and second parts of the LINC amplifier are connected by at least two optical connections.

9. The LINC amplifier according to claim 8, wherein said combiner comprises a Chireix or Wilkinson combiner.

10. A receiving device for reception of signals sent from a transmitting device, wherein said receiving device comprises as a second part of a LINC amplifier:

at least one opto-electrical converter configured to convert at least two phase modulated signal components of constant amplitude from optical signals into electrical signals;

a first output stage configured to amplify the first phase modulated signal component;

a second output stage configured to amplify the second phase modulated signal component; and a combiner configured to combine the two amplified phase modulated signal components of constant amplitude, wherein said receiving device receives said optical signals over at least two optical connections.

11. The receiving device according to claim 10, wherein said receiving device comprises a remote antenna head configured to receive signals sent from a base station.

12. A communication network comprising at least one base station and at least one remote antenna head configured to transmit signals from said base station via said remote antenna head to a user terminal, wherein:

said at least one base station comprises as a first part of a LINC amplifier a first signal path configured to transmit a first phase modulated signal component of constant amplitude, a second signal path configured to transmit a second phase modulated signal component of constant amplitude, and at least one electro-optical converter configured to convert the two phase modulated signal components of constant amplitude from electrical signals into optical signals;

said at least one remote antenna head comprises as a second part of the LINC amplifier at least one opto-electrical converter configured to convert the two phase modulated signal components of constant amplitude from optical signals into electrical signals, a first output stage configured to amplify the first phase modulated signal component, a second output stage configured to amplify the second phase modulated signal component, and a combiner configured to combine the two amplified phase modulated signal components of constant amplitude, wherein said at least one base station is connected through at least two optical connections or at least one optical connection and at least one electrical connection with said at least one remote antenna head.

13. A method for transmission of a data signal from a transmitting device to at least one receiving device using a LINC amplifier for signal amplification, the method comprising:

representing the data signal by two phase modulated signal components of constant amplitude in a first part of the LINC amplifier located in the transmitting device;

converting at least one of the two phase modulated signal components of constant amplitude from an electrical signal into an optical signal in at least one electro-optical converter located in the transmitting device;

transmitting both phase modulated signal components of constant amplitude from the transmitting device to the at least one receiving device with the at least one of the two phase modulated signal components of constant amplitude over at least one optical connection from the transmitting device to the at least one receiving device;

converting the at least one of the two phase modulated signal components of constant amplitude from an optical signal into an electrical signal in at least one opto-electrical converter located in said at least one receiving device;

amplifying and combining the two phase modulated signal components of constant amplitude in a second part of the LINC amplifier that is located in said at least one receiving device;

converting said at least one of the two phase modulated signal components of constant amplitude from an analogue electrical signal to a digital electrical signal in the transmitting device;

transmitting said at least one of the two phase modulated signal components of constant amplitude as a digital optical signal over the at least one optical connection; and converting said at least one of the two phase modulated signal components of constant amplitude from a digital electrical signal to an analogue electrical signal in the receiving device.

14. A method for transmission of a data signal from a transmitting device to at least one receiving device using a LINC amplifier for signal amplification, the method comprising:

representing the data signal by two phase modulated signal components of constant amplitude in a first part of the LINC amplifier located in the transmitting device;

converting at least one of the two phase modulated signal components of constant amplitude from an electrical signal into an optical signal in at least one electro-optical converter located in the transmitting device;

transmitting both phase modulated signal components of constant amplitude from the transmitting device to the at least one receiving device with the at least one of the two phase modulated signal components of constant amplitude over at least one optical connection from the transmitting device to the at least one receiving device;

converting the at least one of the two phase modulated signal components of constant amplitude from an optical signal into an electrical signal in at least one opto-electrical converter located in said at least one receiving device;

amplifying and combining the two phase modulated signal components of constant amplitude in a second part of the LINC amplifier that is located in said at least one receiving device;

converting a radio frequency carrier signal is converted from an electrical signal into an optical radio frequency carrier signal in a further electro-optical converter in the transmitting device;

adding said at least one of the two phase modulated signal components of constant amplitude with the optical radio frequency carrier signal resulting in a combined optical signal;

converting the combined optical signal from an optical signal into an electrical signal in an opto-electrical converter in said at least one receiving device;

upconverting said at least one of the two phase modulated signal components of constant amplitude to radio frequency domain by multiplication with the optical radio frequency carrier signal applying optical heterodyning in the opto-electrical converter.

* * * * *